United States Patent [19]
Apparao et al.

[11] Patent Number: 6,069,633
[45] Date of Patent: May 30, 2000

[54] SPRITE ENGINE

[75] Inventors: Vidur Apparao, Palo Alto; Scott Furman, Union City, both of Calif.

[73] Assignee: Netscape Communications Corporation, Mountain View, Calif.

[21] Appl. No.: 08/933,146

[22] Filed: Sep. 18, 1997

[51] Int. Cl.[7] .................................................. G06T 15/40
[52] U.S. Cl. .......................... 345/421; 345/424; 345/435
[58] Field of Search .................................... 345/421, 424, 345/435

[56] References Cited

U.S. PATENT DOCUMENTS

| | | | |
|---|---|---|---|
| 5,001,469 | 3/1991 | Pappas et al. | 340/721 |
| 5,128,658 | 7/1992 | Pappas et al. | 340/703 |
| 5,216,413 | 6/1993 | Seiler et al. | 340/721 |
| 5,396,263 | 3/1995 | Seiler et al. | 345/115 |
| 5,487,145 | 1/1996 | Marsh et al. | 395/162 |
| 5,546,518 | 8/1996 | Blossom et al. | 395/152 |
| 5,831,622 | 11/1998 | Ayala | 345/423 |
| 5,831,628 | 11/1998 | Shimizu | 345/435 |
| 5,892,521 | 4/1999 | Blossom et al. | 345/501 |
| 5,898,437 | 4/1999 | Deolaliker | 345/421 |

FOREIGN PATENT DOCUMENTS

| | | | |
|---|---|---|---|
| 0 652 524 A1 | 5/1995 | European Pat. Off. | G06F 15/66 |

OTHER PUBLICATIONS

Memo from Scott Furman regarding Microsoft Win32 Software Development Kit.

*Primary Examiner*—Mark R. Powell
*Assistant Examiner*—Motilewa Good-Johnson
*Attorney, Agent, or Firm*—Michael A. Glenn; Kirk Wong

[57] ABSTRACT

A sprite engine or compositor that is well-adapted to a variety of adaptable to a host platforms and that minimizes the amount of drawing that occurs on a refresh of a frame-buffer display area. The invention exploits the host platform's abilities to perform both back-to-front and front-to-back drawing algorithms, where the choice of algorithm used depends upon whether a sprite is opaque or transparent. Each sprite registers itself with a sprite engine, identifying whether or not the sprite is wholly opaque or not is transparent, the bounding area of the sprite, and the function that the sprite uses to draw. The function can be the drawing routine that is available from the host platform or operating system. The sprite engine keeps track of the Z position of each sprite and examines each sprite to determine if the sprite overlaps a particular region that needs to be refreshed. Sprites that are rectangular and opaque are considered special cases that can be easily drawn using a the host platform's front-to-back drawing algorithm. In a top-down manner, by Z position, all sprites that are opaque are allowed to draw. All other kinds of sprites are drawn in a back-to-front manner. When a transparent sprite is found, the sprite engine searches the remaining sprites in a bottom-up manner and draws the sprites with a Z position below the transparent sprite, finishing with the transparent sprite, using a back-to-front algorithm in the remaining region.

17 Claims, 10 Drawing Sheets

SPRITE ENGINE

TECHNICAL FIELD

1. Background of the Invention

The invention relates to the generation and display of an image that includes multiple planes of information. More particularly, the invention relates to displaying a plurality of opaque and/or transparent graphical entities, where each entity has a specific X and Y position and Z order relative to the other entities in the composite image.

2. Description of the Prior Art

Computer-controlled game devices and personal computers use a similar approach for generating graphical images. On game devices these graphical images are generated using an animation engine, while on personal computers they are generated using a windowing system. The overall image that is displayed consists of opaque or partially transparent entities that can be drawn onto the computer screen. Each such entity has a X and Y position on the display, a width and height which indicate its maximum dimensions, as well as a depth indicator, its Z position. When two such graphical entities overlap, there is a definite order so that one is above the other and each entity has a relative Z position in relation to all of the other entities which is the same at each location on the display.

On game systems, these graphical entities are called "sprites." Often, A common example of a sprite simply consists ofis a bitmapped image. A "sprite engine" is used in framebuffer-oriented game systems to control where and in what order sprites are drawn on a display. It is the responsibility of the sprite engine to calculate the minimal area of the display to be redrawn as characteristics of sprites (such as their position) change. Consider the case where two sprites move from initial positions p1 and p2 respectively to final positions p3 and p4. It is evident that there are four parts of the display that need to be redrawn—the original positions of the sprites because they need to be erased, and the new positions of the sprites, in that order. If p1, p2, p3 and p4 are distinct, non-overlapping positions, each pixel needs to be area can be drawn exactly once. However, if any two or more of these positions are overlapping, the amount of drawing can be minimized by not drawing the overlapping pixels multiple times.

In the case of opaque, rectangular sprites, the calculation of the overlapping regions is relatively easy—the regions are calculated as a result of simple union and intersection operations of the rectangular boundaries of the sprites. However, a sprite can also have transparent areas of arbitrary complexitybe of arbitrary transparency, e.g. text. The areas surrounding the pixels that constitute a text character can be transparent to allow another sprite behind it, for example, an image, to show through. In the case of these partially opaquetransparent sprites, the calculation of the overlapping regions between sprites may beis significantly more expensive computationally because the opaque regions do not have simple rectangular boundaries.

On personal computers, screen images are often generated using a windowing system. Windowing systems are similar in many ways to sprite engines, although each has different motivations and performance requirementsdifferent needs for performance. Windowing systems have windows that correspond to different applications; each application may have multiple windows. As with sprites, windows have a Z dimension, which is used to determine a total ordering of depth between all windows in a windowing system. In general, windows are rectangular. When drawing windows, the same issues as with sprites must be taken into account. Thus, that portion of every window that needs to be redrawna window to be displayed must be calculated when an area of the display needs to be refreshed. As with sprite engines, a windowing system endeavors to avoid redrawing any pixel more than once. Since windows are almost always rectangular, this is relatively easy to accomplish efficiently.

Many windowing systems support subwindows, that is, within one window there may be multiple subwindows. Some windowing systems also provide a root window, where the entire display is taken up by the root window in which subwindows provide applications windows. The application windows, in turn, may have their own subwindows, which may be different documents within the application.

The windowing system must calculate the minimal set of windows it must draw to complete a refresh in the same manner as the sprite engine. Windows also include a Z order dimension, in addition to the subwindow concept. Most windowing systems place subwindows in Z order in front of the parent window, such that the parent window and all of its subwindows are a single unit that can be at some position with respect to the siblings of the parent window. In summary, there is a total ordering of depth between all windows in a windowing system.

There are generally two methods of compositing or building up what needs to be drawn on the display, i.e. back-to-front and front-to-back. Back-to-front drawing is sometimes referred to as thea painter's algorithm. That is, a painting is made using multiple layers and, in the same manner, a painter's algorithm draws the lowest layer first, then each subsequent layer, one on top of the other. The painter's algorithm may cause excessiverequires more drawing because portions of sprites are always drawn even though they may be overlapped by another sprite. Determining the minimal subset of pixels to draw for each sprite can be a computationallymathematically intensive operation and one way to minimize that is using the painter's algorithm because no calculations are necessary to determine overlap-involved when all sprites areeverything is drawn onto the display.

U.S. Pat. No. 5,546,518 issued to Blossom et al. on Aug. 13, 1996, discloses a back-to-front, pixel-based system that uses a data processing device to write pixel values of individual sprites to a display composition buffer. Writing begins with the sprite having the greatest depth and proceeds with the remaining sprites in order of decreasing sprite depth. In addition, a video overlay board is included to overlay a video image over certain pixels containing a chroma-key value.

In the front-to-back algorithm, the topmost layer is drawn first. After the topmost layer is drawn, that portion of it that is opaqueits area is subtracted from the area that will be drawn by any sprite below this one. Then the next layer down is drawn, except for pixels outside the aforementioned drawing area that needs to be redrawn. The next layer is drawn and its area is subtracted from the remaining area to be redrawn. Its opaque pixels are subtracted from the drawing area. Each subsequent layer is drawn in the same manner. The front-to-back algorithm may perform less drawingis more efficient than the back-to-front algorithm because it does not draw portions of sprites that are not visible when they are obscured by other spritesnot displayed.

In a front-to-back implementation, if a sprite consists of text with transparent areas surrounding the text, the text is drawn first. The area of the pixels that make up the text is then subtracted from the next underlying sprite to be drawn. The remaining part of that sprite is then drawn.

The ability to create and manipulate a "region" is necessary when implementing a front-to-back algorithm. A region is used herein to refer to an arbitrary set of pixels on the display. With regard to opaque rectangular sprites, for example, a region is typically not a complex area. Rather, it is a combination of rectangles. However, in the case of transparent text, a region can be very complex. Therefore, efficiently implementing a front-to-back algorithm with sprites that include portions having transparency requires a sophisticated region format. On most of the popular platforms (e.g. Microsoft Windows and X-Windows), the native region format that is available from the operating system (OS) is not that sophisticated and cannot efficiently represent or efficiently operate on complex regions. Performing geometric operations such as intersection, union or subtraction with complex regions on those platforms is both central processing unit (CPU) intensive and memory-intensive and is, therefore, expensive.

Although the front-to-back approach may perform less drawing, the algorithm requires that a record be maintained of the portion of the composited image that remains to be drawn as each layer is handled. The algorithm does require a record of the portion of the composited image that must be redrawn at every layer. The opaque area of each layer that is drawn is must be subtracted from thisthe remaining area. This is a computationally tractablestraightforward approach when the sprites are opaque rectangles, but whenever any portion of a sprite is transparent, the calculations required become time-consumingcomplex.

If a sprite contains text with transparent areas surrounding the text, the text is drawn first. The area of the text is then subtracted from the next underlying sprite to be drawn. The remaining part of that sprite is then drawn. The operation of determining which pixel the text picks up and then subtracting that pixel from the next underlying sprite is mathematically expensive.

U.S. Pat. No. 5,216,413 issued to Seiler et al. on Jun. 1, 1993, discloses a system that defines windows as a priority-ordered list of rectangles. For a given pixel to be drawn, the highest priority rectangle containing the pixel is found. This rectangle is the only rectangle drawn. This is a front-to-back system.

U.S. Pat. No. 5,487,145 issued to Marsh et al. on Jan. 23, 1996, discloses a compositing architecture for correct rendering of overlapping opaque and translucent regions of respective graphic images. This system provides rapid pixel restoration by buffering data corresponding to a portion of a graphic image which is beneath another graphic image. If the overlapping image is moved, the data in this buffer associated with the next lowest layer (in the Z-axis) are available for immediate display. The method in which the contents of the buffers are displayed is a front-to-back algorithm.

The concept of a region is maintained when using a front-to-back algorithm. A region is used herein to refer to an arbitrary area of the display. With regard to opaque rectangular sprites, for example, a region is not considered a complex area. Rather, it is a combination of rectangles. However, in the case of transparent text, a region is a very complex area of the display. Therefore, using a front-to-back algorithm with sprites that include portions having transparency requires a sophisticated region format. On most of the popular platforms (e.g. Microsoft Windows and X-Windows), the native region format that is available from the operating system (OS) is not that sophisticated and cannot efficiently represent complex regions. Performing various operations with sprites that include portions having transparency on those platforms is central processing unit (CPU) intensive and, therefore, expensive.

It would be advantageous to provide a sprite engine that balances the simplicity of the back-to-front algorithm and the efficiency of the front-to-back algorithm. It would further be advantageous to provide a sprite engine that performs display region refreshes while minimizing the redrawing of unnecessary portions of underlying sprites.

SUMMARY OF THE INVENTION

The invention provides a sprite engine or compositor that is well-adapted for a variety of host platforms. adaptable to the host platform. The invention minimizes the amount of drawing that occurs on a refresh of a display area. This is achieved by efficiently using the host platform's graphic capabilitiesabilities and combining both back-to-front and front-to-back drawing algorithms.

An application registers each sprite and its characteristics with the sprite engine when the sprite is createdAn application creates a sprite knowing whether it has opaque or transparent properties. Each sprite identifies its characteristics and registers itself with the sprite engine. The characteristics of a sprite include such factors as whether or not the sprite contains transparent areasis transparent, itsthe position, bounding area, and Z-orderz-order of the sprite. The application is responsible for notifying the sprite engine of any subsequent alterations in these characteristics.

Sprites that are rectangular and opaque are considered special cases that can be easily drawn using the front-to-back drawing algorithm. However, the native region formats are not efficientsophisticated enough onin many host platforms to efficiently support front-to-back drawing where there are overlapping sprites that exhibit arbitrarily complex areas ofy transparency. To draw other kinds oftransparent sprites, the algorithm reverts to back-to-front drawing.

The sprite engine keeps track of the Z position of each sprite. Whenever a region needs to be refreshed, the sprite engine examines each sprite to determine if the sprite overlaps that region. The drawing occurs in two passes:

The first pass occurs in a front-to-backtop-down manner, by Z position. Only wholly opaque sprites sprites that are not overlapped by any transparent sprites may be drawn in this pass. As each sprite is considered, the algorithm keeps track of that portion of the display that remains to be drawn and which is not obscured by other wholly opaque sprites, $R_{unobscured}$. Additionally, the algorithm retains a region for every sprite that represents the unobscured area of that sprite, $R_i$. All drawing is limited to the area represented by $R_i$, whether a sprite is drawn in the first or second pass. In this pass, the algorithm keeps track of three regions—the total area to be drawn (R1), the area not yet drawn to with sprites in this pass (R2) and the area covered by transparent sprites (R3). At the beginning of the top-down pass, R2 is the same as R1 and R3 is empty. If a sprite encountered in the top-down pass is transparent and its bounding rectangle overlaps the area R2, its bounding rectangle is added to R3. Note that, since it is transparent, it is not drawn in this pass. If a sprite is opaque and its bounding box overlaps the area R2, it may be drawn in this pass only if it is not overlapped by a transparent sprite, i.e. if its bounding box does not intersect the region R3.

The second pass traverses the sprites in a back-to-front manner, by Z positionoccurs in a bottom-up manner. Transparent sprites are drawn in this pass, as are opaque sprites that were not drawn in the top-down pass since they were overlapped by transparent sprites. In this pass, no Only sprites that contain transparent areas are drawn in this pass. Drawing is limited to the region, $R_i$, computed for each sprite in the first pass. No region maintenance need happen since we are using the painter's algorithm. Thus, this algorithm combines both front-to-backtop-down and back-to-frontbottom-up drawing to minimize drawing for opaque areas of a display, while still maintaining the simplicity of the painter's algorithm for areas of the display that include sprites with transparent areastransparent sprites.

DETAILED DESCRIPTION OF THE INVENTION

Figure 1:
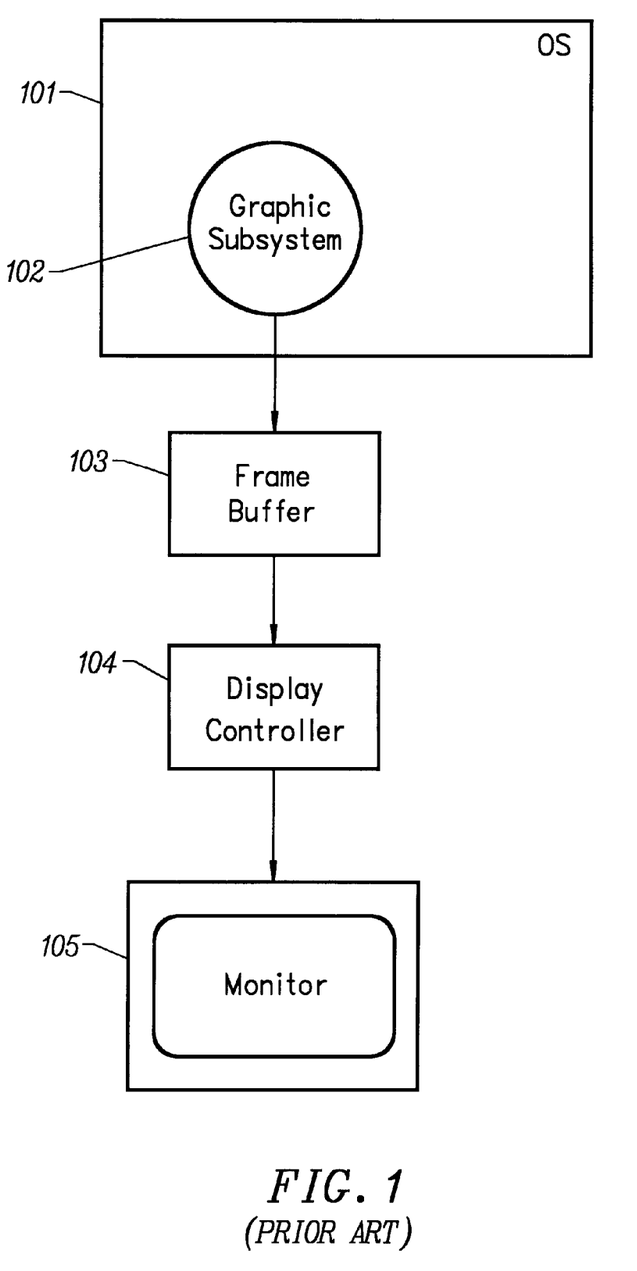
FIG. 1 is a block schematic diagram of a display subsystem.

Referring to FIG. 1, it can be seen that typical game and windowing systems have similar display subsystems. An operating system (OS) or host platform 101 contains a graphics subsystem 102. The graphics subsystem 102 fills a frame buffer 103 with display information. The display information is taken out of the frame buffer 103 by a display controller 104 and displayed on the display or monitor 105 by the display controller 104.

Regions are arbitrarily defined in the display area by a game or windowing system. On Microsoft Windows and X-Windows, regions are not sophisticated and are essentially stored as a list of rectangles. With regard to FIG. 2, in a front-to-back drawing with rectangular opaque sprites, an area is selected to be redrawn. That area is represented as a region 201. This is a very simple region consisting of a single rectangle. A sprite 202 is drawn into the region. The sprite area is subtracted from the original drawing region. There are many ways that the region may be divided into rectangles. Thus, those areas of the region 201 that remain after the sprite 202 is drawn are divided into rectangles. The region is represented as a list of rectangles 203, 204, 205, and 206.

Figure 2:
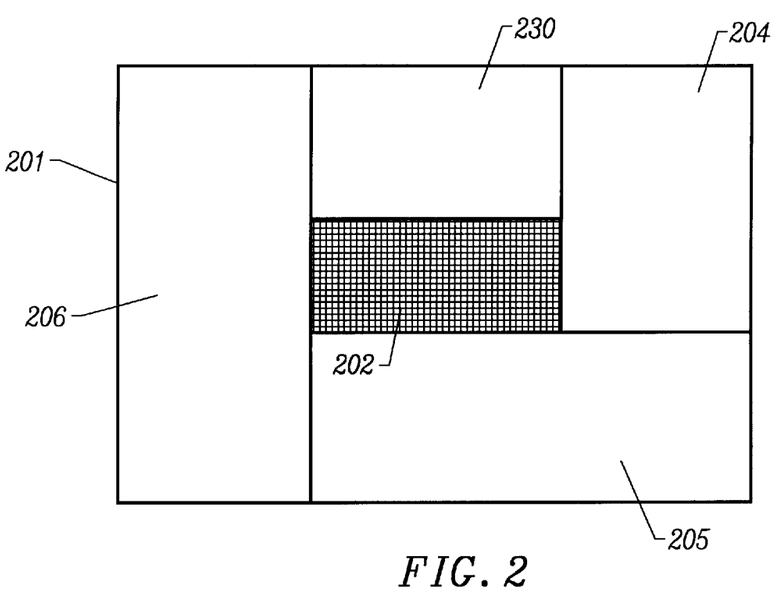
FIG. 2 is a block diagram of an area on a display that includes rectangular opaque sprites according to the invention.

Another way of representing the region is to use a single bitmapbit map, where each pixel is a separate bit. This type of representation can beis expensive memory-wise when compared to the use of rectangles where the region can be represented simply, with rectangles, as in this caseas four rectangles.

As previously mentioned, on Microsoft Windows and X-Windows, regions are represented as lists of rectangles and not as bitmapspixels. It is therefore more efficient to use rectangle listss to manipulatewhenever regions when they can be represented with short listspossible. If rectangles are used for front-to-back drawing, then a bit map is only necessary with the back-to-front drawing. In the case of Microsoft Windows and X-Windows, one constraint is the representation provided by the native operating system. This is one reason why the hybrid system disclosed herein is beneficialnecessary. Thus, the invention is designed to adapt a sophisticated sprite technique to the constraints of the operating system, particularly Microsoft Windows and X-Windows.

The decision of when to use a front-to-back algorithm or a back-to-front algorithm for a given sprite in a given drawing pass is made on- the- fly by the sprite engine. A particular sprite is drawn at mostonly drawn once, in one of these two passes. If, for example, it is known that part of a sprite is drawn such that it is obscured by another sprite that has transparency and thus part of it would be drawn back-to-front, the sprite engine avoids having to draw only part of it back-to-front. It draws the entire sprite back-to-front, which is more efficient.

Figure 3:
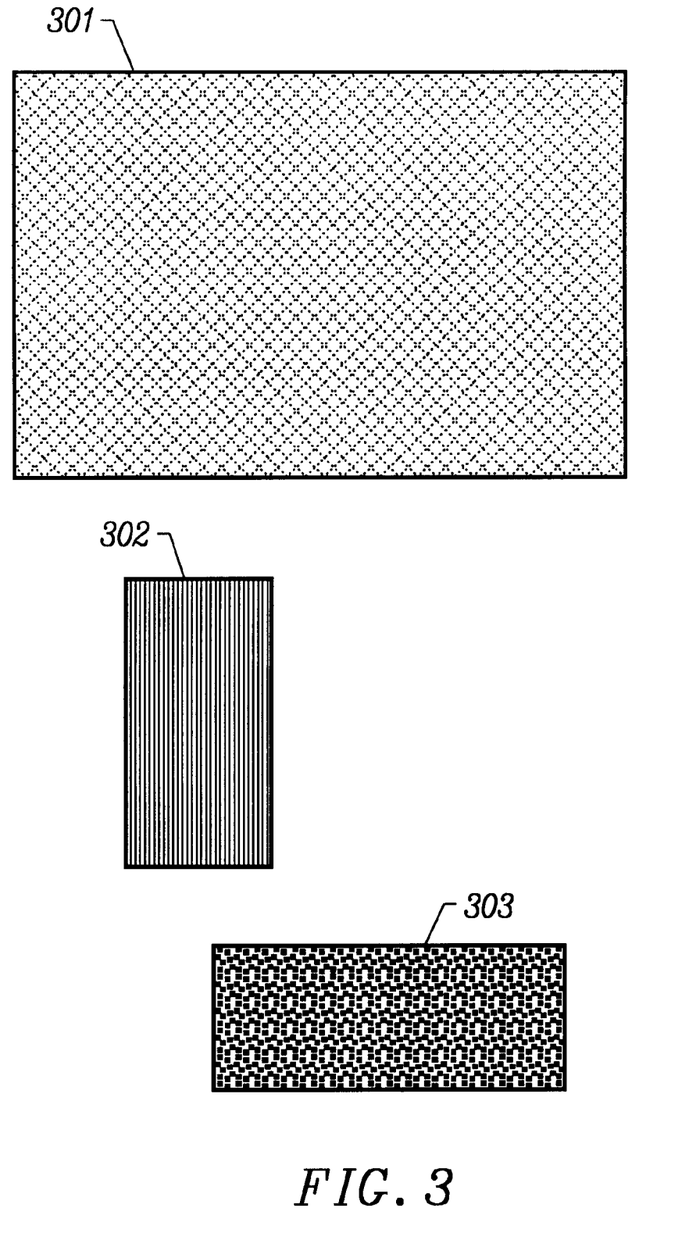
FIG. 3 is a block diagram showing three sprites on a display according to the invention.
Figure 4:
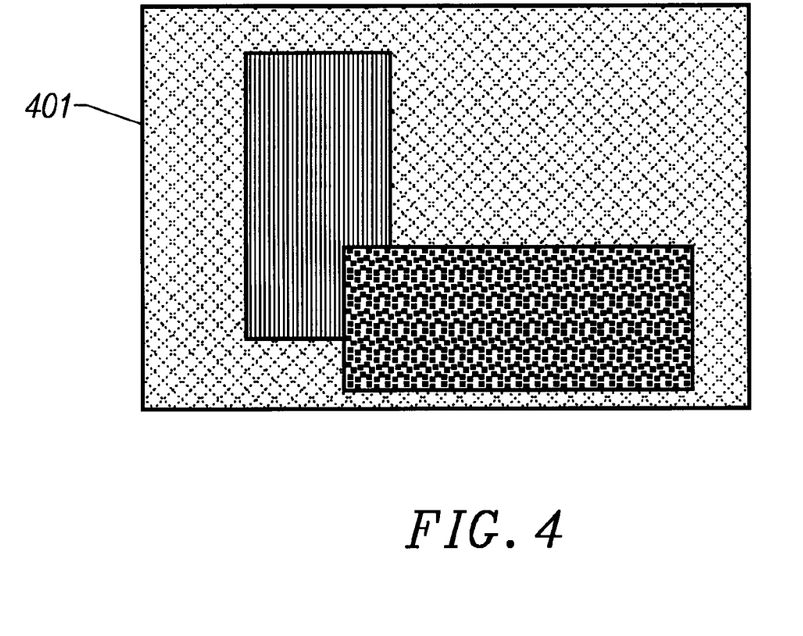
FIG. 4 is a block diagram showing an image on a display, where the image is composited using a back-to-front algorithm according to the invention.

With regard to FIG. 3, three sprites 301, 302, and 303 are shown. Sprite 303 is at the topmost Z level, with sprite 302 at the next level, and sprite 301 at the lowest level. A painter's algorithm draws the lowest layer first, then each subsequent layer, one on top of the other. FIG. 4 shows the resultant image 401 after sprite 301 is drawn first, then sprite 302, and finally sprite 303. The painter's algorithm requires more drawing because exposed portions of sprites are always drawn, even though they are overlapped by another sprite.

Figure 5:
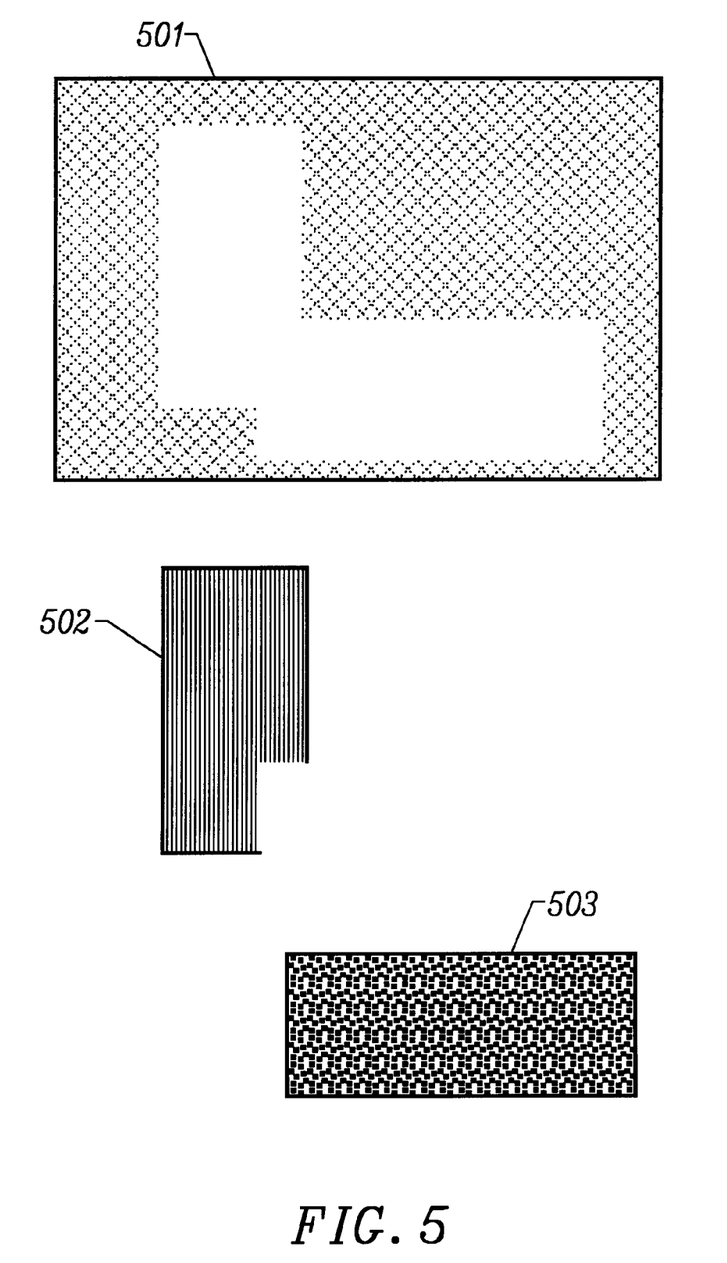
FIG. 5 is a block diagram showing three sprites, as shown in FIG. 4, where the image is composited using front-to-back area subtraction according to the invention.

In the front-to-back algorithm, the topmost layer is drawn first. After the topmost layer is drawn, then its opaque area is subtracted from the total area that needs to be redrawn. The next layer is drawn and its opaque area subtracted from the remaining area to be redrawn. Each subsequent layer is drawn in the same manner. FIG. 5 shows each of the sprites with the higher level sprite opaque areas subtracted from its image. Sprite 503 is intact because it is at the highest Z level. Sprite 502 has sprite 503's overlapping opaque area subtracted from it. Finally, sprite 501 has both sprite 502 and 503's opaque areas subtracted from it because it is at the lowest Z level and is overlapped by both of the other sprites. The resultant image is identical to the image 401 depicted in FIG. 4. The front-to-back algorithm requires less drawingis more efficient than the back-to-front algorithm because it does not unnecessarily draw obscuredunnecessary portions of sprites.

Figure 6:
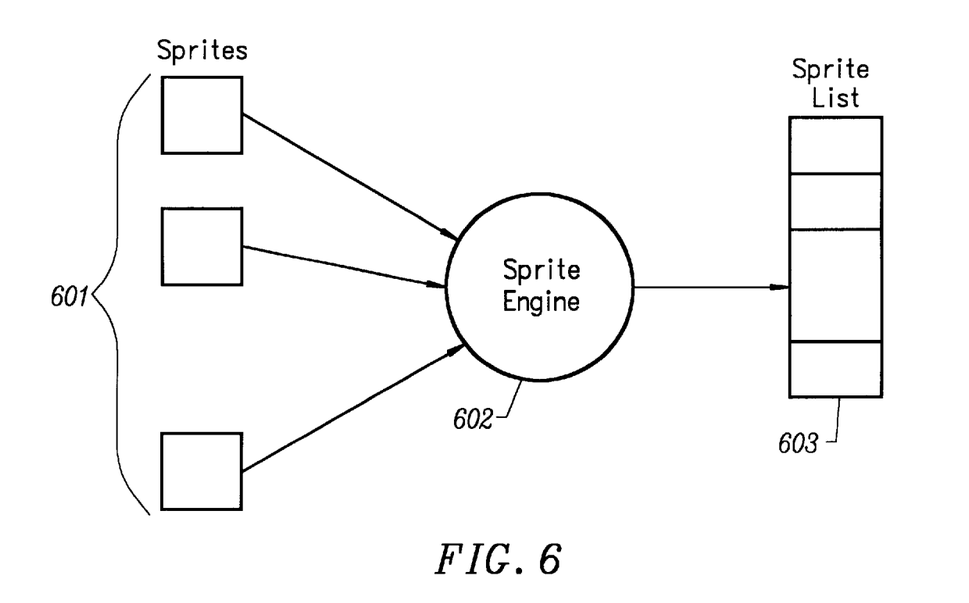
FIG. 6 is a block schematic diagram showing sprite registration with a sprite engine according to the invention.

Referring to FIG. 6, sprites 601 are registered with the sprite engine or compositor 602 and are essentially put in a list 603 maintained by the sprite engine or compositor 602. The list 603 is effectively in Z order in front-to-back or back-to-front sortingorder. Additionally, for each sprite there is an indication of whether or not it has transparent areasis transparent, the bounding rectanglebox of the sprite, and a reference to the function responsible for drawing the spritethe drawing function.

When an application creates a sprite, it provides a bounding rectangle which encompasses any portions of the sprite that are non-transparent, i.e. the bounding rectangle must enclose the visible portions of the sprite. The application is responsible for notifying the sprite engine of any changes in a sprite's bounding rectangle as the sprite's shape or size change. The sprite engine uses the bounding rectangle information to optimize its operation. When the sprite engine is instructed to draw a particular area of the display and a sprite's bounding rectangle does not fall in that area of the display, the sprite engine will not invoke the sprite's drawing function for that particular case. It is therefore advantageous for the application to specify the minimum possible bounding rectangle for a sprite. The sprite engine is not necessarily concerned with what is inside a sprite. It only knows that something needs to be drawn, and that it is either entirely opaque or it is potentially partially transparent. It also knows that the sprite cannot be larger than a certain size. When an application creates a sprite it must tell the sprite engine that the sprite is never bigger than a certain size. The sprite engine uses that information to optimize its operation. When the sprite engine is instructed to draw a particular area of the display and a sprite does not fall in that area of the display, the sprite engine never tells that sprite to draw for that particular case.

Many windowing systems support subwindows, that is, within one window there may be multiple subwindows. Some windowing systems also provide a root window, where the entire display is taken up by the root window in which subwindows provide applications windows. The application windows, in turn, may have their own subwindows, which may be different documents within the application.

As previously mentioned, windows also have the notion of Z order, in addition to the subwindow concept. Most windowing systems place subwindows in Z order in front of the parent window, such that the parent window and all of its subwindows are a single unit that can be at some position with respect to the siblings of the parent window. The registration between the parent and the children remains constant, even though the parent may be moved. Therefore, one skilled in the art can readily appreciate that these techniques can be applied to windowing systems as well as to sprite engines. Windows and subwindows are drawn in the order of their Z position using a front-to-back or back-to-front algorithm, in the same manner as sprites.

Figure 7:
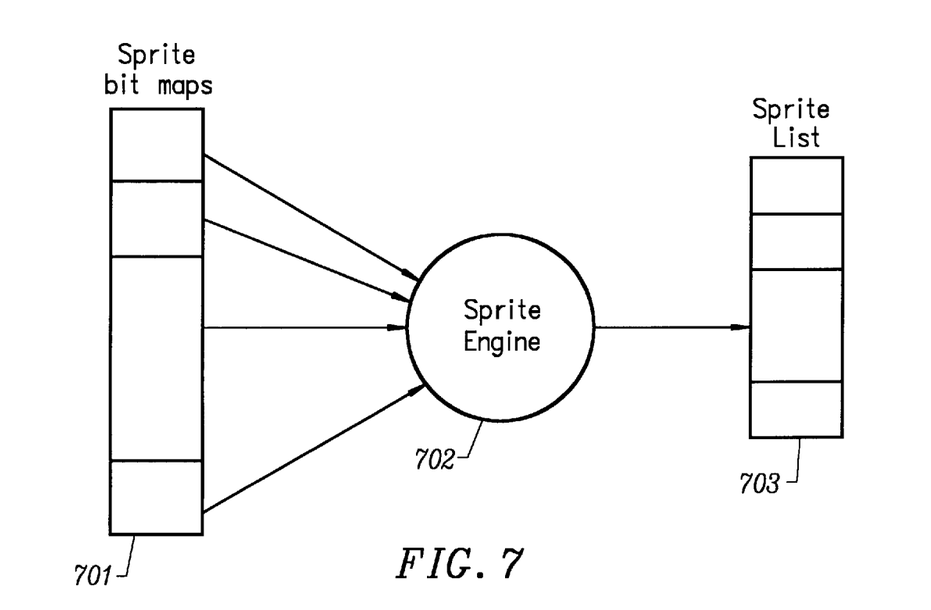
FIG. 7 is a block schematic diagram showing game system registration of sprite bitmapbit maps with a sprite engine according to the invention.

Referring to FIG. 7, if a game system uses a typical sprite engine, it first loads bit maps 701 that correspond to the sprites. It then takes the bit maps and registers them as sprites with the sprite engine 702. For many game sprite engines a sprite is drawn using a single static bitmap that does not change its bounding rectangle or opacity over time. the concept of a display is a single bit map that is static, and, as it is drawn, it does not change along with its transparent areas.

The invention is intended for application to any system element that can draw. When a sprite registers, it does not register a bit map to be drawn. Rather, it registers a function to be called when a draw needs to occur. That function can draw whatever it wants. For example, a function might draw a different bit of text every time it is told to draw, which means that the transparency is not something that stays true across every draw. In other words, a sprite is an object, and it has a draw method.

The invention is intended for application to any system element that can be drawn. The sprite engine possesses no specific information regarding the appearance of the sprite other than its bounding rectangle and whether or not the sprite is wholly opaque within the bounding rectangle. There is no bitmap registered for each sprite. Rather, when a sprite must be drawn, the sprite engine invokes the sprite's registered drawing function. That function can draw anything within the sprite's bounding rectangle. For example, a game system might provide a function which draws a static bitmap. Alternatively, a drawing function might display a different text string every time it is invoked, which means that the opaque areas of the sprite need not remain the same across every draw. (However, the application is responsible for keeping the sprite engine informed of changes in an objects opacity.) In object-oriented terms, a sprite is an object, and it has a draw method.

In the context of a windowing system, a window is something that an application creates and that application has control of the drawing withinits own concept of what to draw into that window. Therefore, it is similar to a sprite because a window has its own drawing function in the same manner as sprites have their own draw method.

Figure 8:
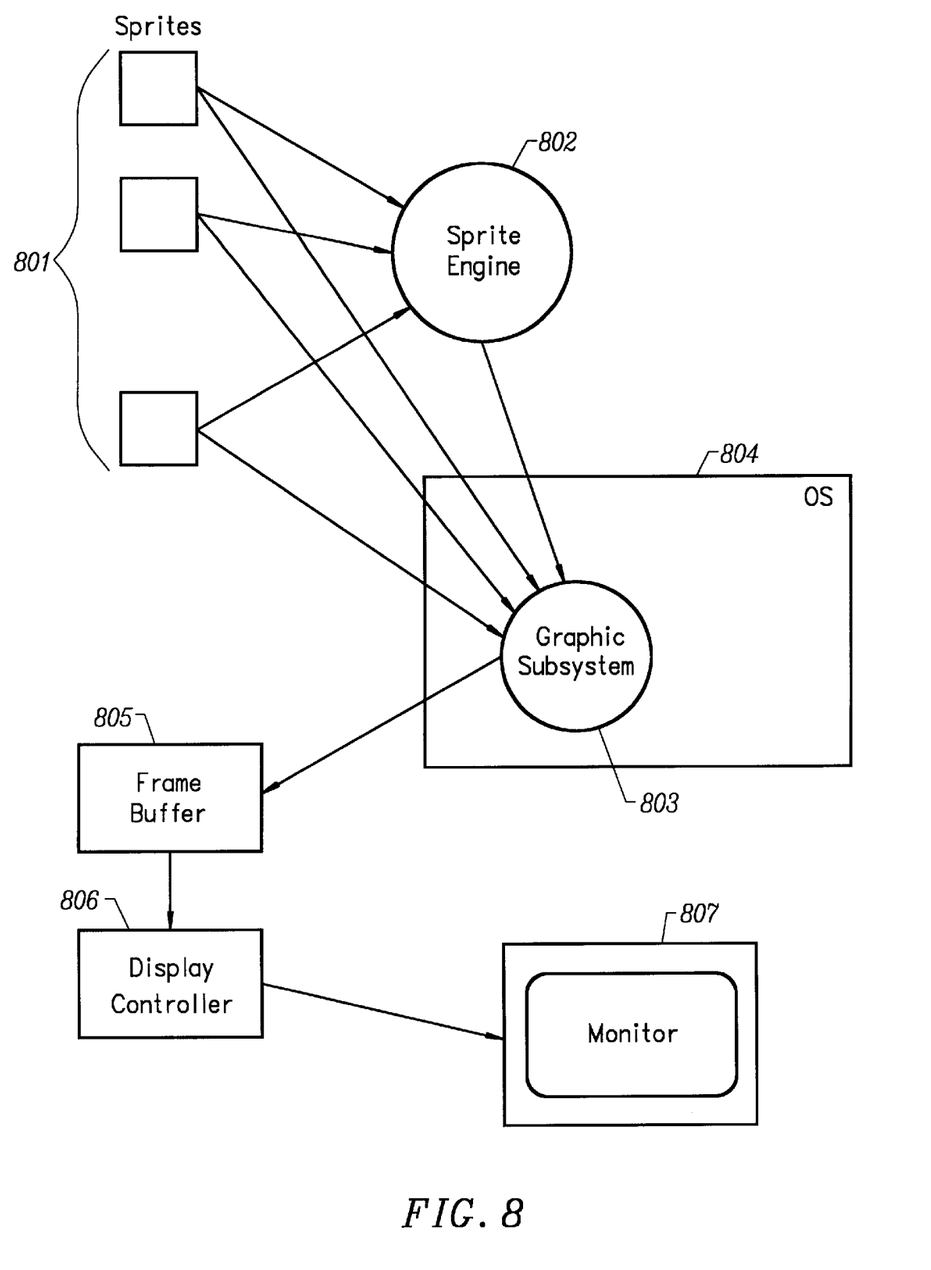
FIG. 8 is a block schematic diagram showing a sprite and an engine interface for a display subsystem according to the invention.

With regard to FIG. 8, in a preferred embodiment of the invention, sprites 801 are registered with the sprite engine or compositor 802. The sprite engine 802 determines where and when the sprites 801 draw and the sprites 801 draw using the graphics subsystem 803. The graphics subsystem 803 is a component of the OS or host platform 804. The graphic subsystem 803 draws into the frame buffer 805. The frame buffer 805 is the area of video memory that corresponds to what is displayed on the monitor 807. The sprite engine 802 also uses the graphics subsystem 803 for its drawing. The sprite engine 802 may be combined with the graphic subsystem 803 to form a single subsystem.

The sprite engine's determination of the order in which spriteswhen the sprites should draw is based on either the back-to-front or the front-to-back approach. In a simple back-to-frontfront-to-back system with rectangular opaque sprites, the sprite engine instructs a sprite, e.g. Sprite 12, to draw and Sprite 12 then uses the graphics subsystem to draw. The sprite engine then instructs Sprite 21 to draw, and Sprite 21 does the same. Once again, the main function of the sprite engine is to maintain a list of the ordering of the sprites and to tell the sprites when and in what order to draw.

When an application creates uses a mechanism to create a sprite, it registers the sprite with the sprite engine. As long as the sprite remains active, the application is responsible for keeping the sprite engine informed of its current characteristics: It informs the sprite engine what sprite number it is, its bounding rectanglebox, drawing function, and the presence or absence of transparent areas within the bounding rectangleif it is transparent or opaque. The sprite engine internally maintains its list of sprites as a linear list or a doubly-linked list. The list is maintained in Z order, so the sprite engine can identify, for example, the topmost sprite in Z order and the bottom most sprite in Z order. When the sprite engine is told to redraw areas of the display, it decides which sprites need to draw, or which sprites overlap the area that needs to be redrawn. It then decides on a per-sprite basis whether it should draw the sprites in the front-to-back pass or wait until the back-to-front pass to actually draw them.

Figure 9:
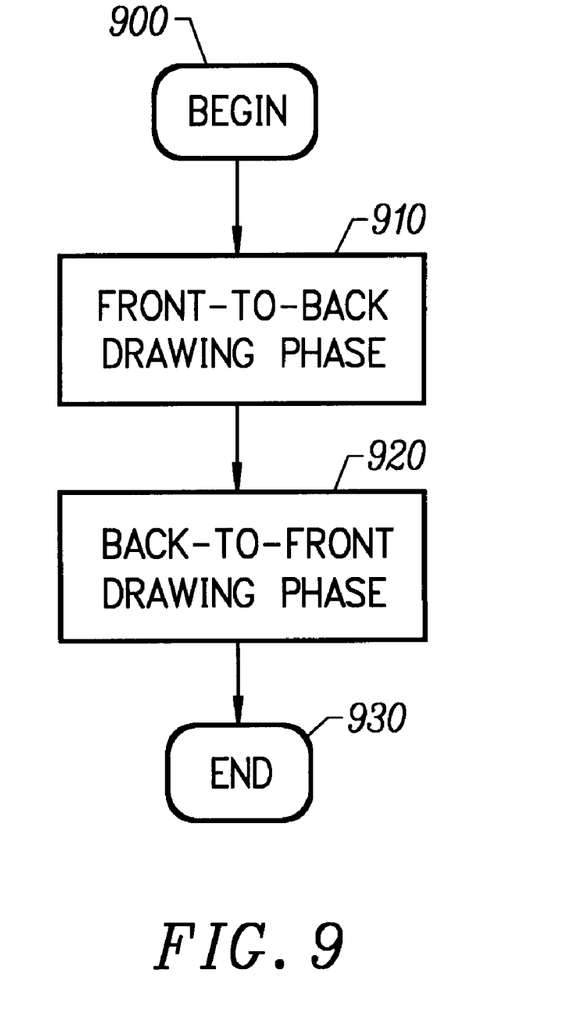
FIG. 9 is a flow diagram showing operation of a preferred embodiment of the invention.

FIG. 9 is a flow diagram showing operation of a preferred embodiment of the invention. When the drawing process begins 900 a front-to-back drawing phase 910 is first commenced. Upon completion of this first phase, a back-to-front drawing phase 920 is entered. At the conclusion of the back-to-front drawing phase, the process ends 930.

Figure 10:
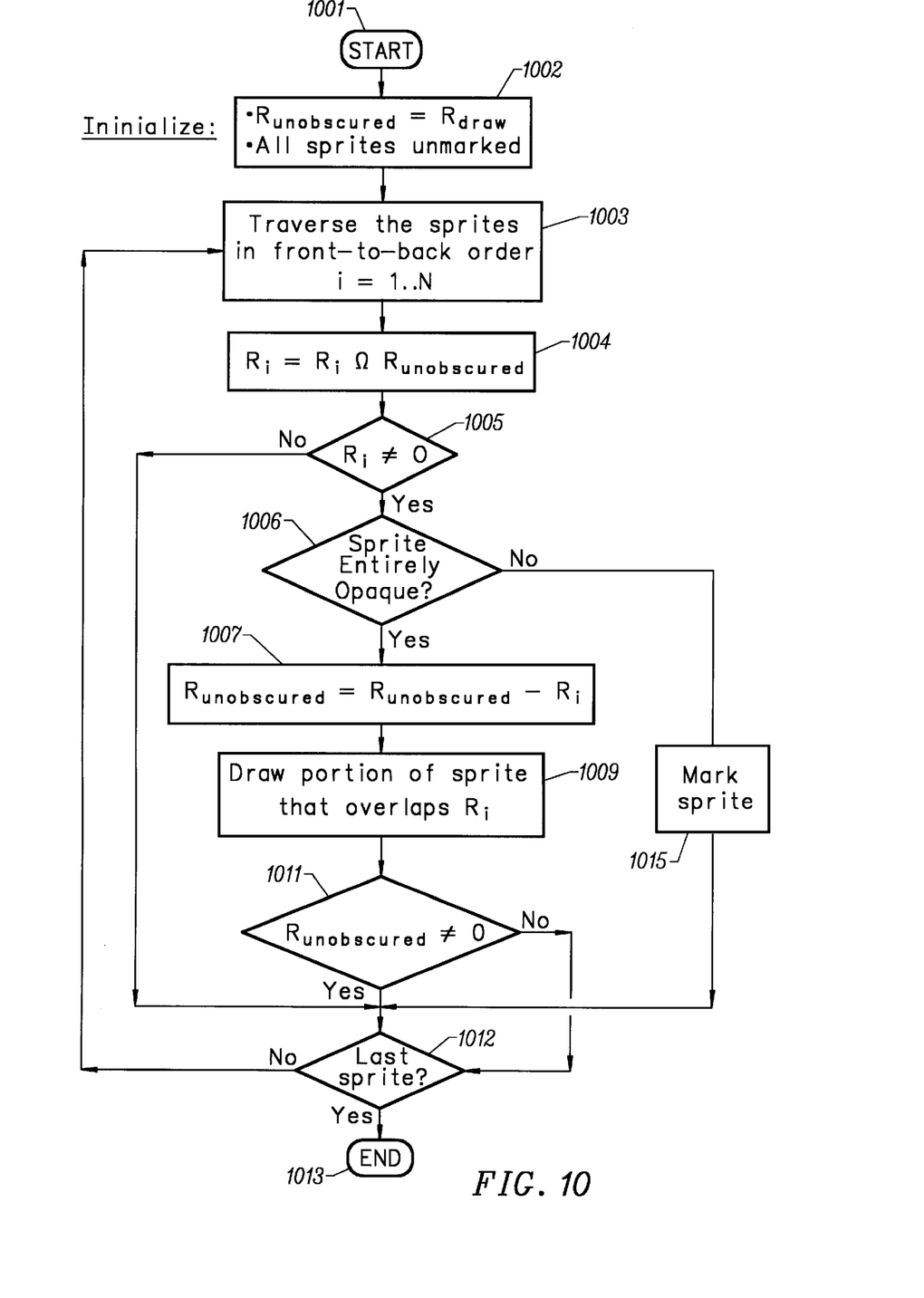
FIG. 10 is a flow diagram showing a front-to-back drawing phase of a preferred embodiment of the invention.

FIG. 10 is a flow diagram showing a front-to-back drawing phase of a preferred embodiment of the invention. With regard to FIG. 10, the sprite engine starts 1001 with the region to be drawndraw area parameters which are passed to it by a calling routine. The sprite engine is initialized 1002, such that the remaining region to be drawn is not obscured by any other spritesunobscured ($R_{unobscured}=R_{draw}$) and, all sprites have their drawing area, $R_i$, initialized to their entire bounding rectangle, and all sprites are unmarked. The sprite engine contains a list of all the sprites that have been registered with the sprite engine. Each sprite is registered with the sprite engine by the application that created the sprite. The creating application passes the sprite engine the sprite's Z order, bounding rectanglebox parameters, whether or not the sprite containsis transparent areas, and the drawing routine for the sprite. The sprite engine records all of the information in the list. The list is organized in an increasing or decreasing order of each sprite's Z position.

The sprite engine keeps track of the Z position of each sprite. Whenever a region needs to be refreshed, the sprite engine examines each sprite to determine if the sprite overlaps that region. The drawing occurs in two passes:

The first pass occurs in a top-down manner, by Z position. Only opaque sprites that are not overlapped by any transparent sprites may be drawn in this pass. In this pass, the algorithm keeps track of three regions—the total area to be drawn (R1), the area not yet drawn to by sprites in this pass (R2) and the area covered by transparent sprites (R3). At the beginning of the top-down pass, R2 is the same as R1 and R3 is empty. If a sprite encountered in the top-down pass is transparent and its bounding rectangle overlaps the area R2, its bounding rectangle is added to R3. Note that, since it is transparent, it is not drawn in this pass. If a sprite is opaque and its bounding box overlaps the area R2, it may be drawn in this pass only if it is not overlapped by a transparent sprite, i.e. if its bounding box does not intersect the region R3.

During the first pass, the sprite engine initially examines each sprite in the list in front-to-back Z order (i=1 . . . n) 1003 and determines the overlap of the sprite drawing area with the remainingif the sprite overlaps the area to be drawn 1004 ($R_i=-R_i$ ($R_{unobscured}$)). The sprite engine then determines if the sprite is not entirely obscured by opaque sprites above it (Ri (0) 1005. If a sprite does overlap the area to be drawn and is not entirely obscured, the sprite engine checks if the sprite is registered as having transparent or wholly-entirely opaque properties 1006. If the sprite is entirely opaque, then the sprite engine instructs the sprite to draw that portion of the sprite that overlaps the remaining area to be drawn 1009. The sprite uses its registeredwhatever drawing routine that it requires to draw the portion of the sprite covered by its drawing area, $R_i$, intoonto the draw area in the frame buffer. The remaining area to be drawn is updated by subtracting the area of the sprite from its current value ($R_{unobscured}=R_{unobscured}-R_i$) 1007.

An optimization is provided that tests to determine if the entire area to be drawn is covered ($R_{unobscured}$ (0) 1011. If the entire area to be drawn is already covered, then there is no need to continue examining the sprites and this phase of the process is complete 1013. Otherwise, the front-to-back search continues until the last sprite is reached 1012 and the task is completed 1013, or when the front-to-back search finds a sprite that overlaps the draw area but has transparent properties 1011.

If the sprite is not entirely opaque 1006, then the sprite is marked for drawing in the second, back-to-front drawing pass 1015. The sprite's unobscured area, $R_i$, calculated in the front-to-back pass, is preserved for use in that back-to-front drawing operation.Thus, if the sprite intersects with region R3, the sprite engine records that the sprite has to be drawn in the back-to-front search rather than in the front-to-back search. Because that sprite has to be drawn back-to-front, other sprites behind that sprite need to be drawn back-to-front.

Figure 11:
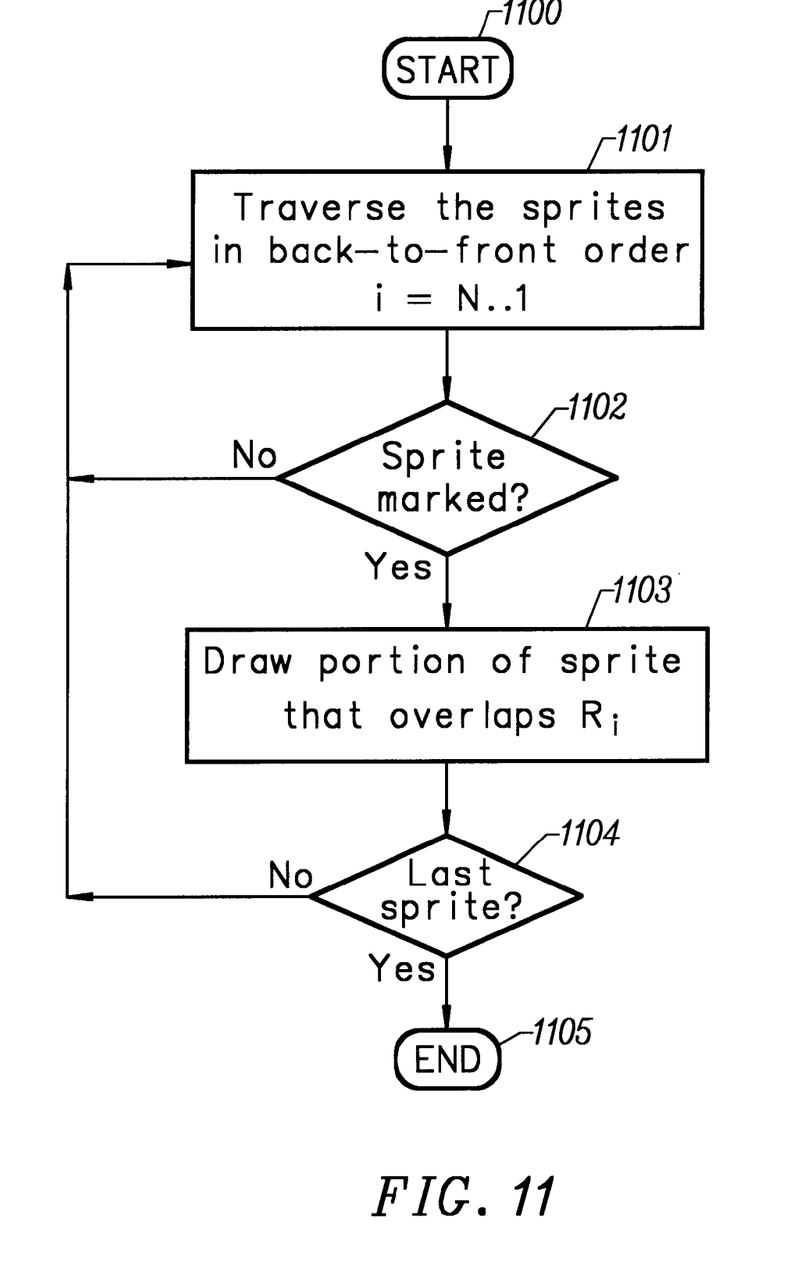
FIG. 11 is a flow diagram showing a back-to-front drawing phase of a preferred embodiment of the invention.

Once the last sprite has been processed during the first pass 1013, the second pass is begun 1100 (see FIG. 11). The second pass occurs in a back-to-frontbottom-up manner. Transparent sprites are drawn in this pass, as are opaque sprites that were not drawn in the front-to-backtop-down pass because they were overlapped by transparent sprites. In this pass, no region maintenance need happen because the system is using the painter's algorithm. Thus, this algorithm combines both front-to-backtop-down and back-to-frontbottom-up drawing to minimize drawing for opaque areas of a display, while still maintaining the simplicity of the painter's algorithm for areas of the display that include transparent sprites.

FIG. 11 is a flow diagram showing a back-to-front drawing phase of a preferred embodiment of the invention. In the second pass, the sprite engine then searches the list in back-to-front order 1101. When a sprite is found that overlaps the draw area and the sprite was marked for drawing back-to-front during the first pass 1102, the sprite engine draws the sprite onto the draw area in the frame buffer by calling the draw routine that was registered with the sprite, using the sprite's draw region, $R_i$ computed in the first pass 1103. Each remaining sprite is treated in the same manner until each transparent sprite that was previously marked is drawn 1104. If the last sprite has been processed, then the draw area has been completed and the sprite engine's task is completed 1105.

At a higher level, the sprite engine walks down the list, going from the top to the very bottom sprite, and for each sprite it keeps track of a particular arbitrary region as well as an overall region. Then it walks backwards, going from the bottom most sprite up to the topmost sprite, taking into account those particular regions that tells it which parts of the sprite need to be drawn and which do not. It takes the sprites that it did not handle on the top-down phase and draws them in the bottom-up phase.At a higher level, the sprite engine walks down the list in Z order, going from the top to the very bottom sprite, and for each sprite it computes a region containing that portion of the sprite not obscured by opaque sprites above. The visible parts of any wholly sprites that are wholly opaque are drawn in this pass. Then the sprite engine walks backwards, going from the bottom most sprite up to the topmost sprite, taking into account those regions constructed in the first pass that tell it which parts of each sprite need to be drawn and which do not. It takes the sprites that it did not draw in the front-to-back phase and draws them in the back-to-front phase.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A process for displaying multiple planes of information on a selected area of a display or computer monitor, comprising the steps of:

creating and maintaining a list of entities wherein each entity corresponds to at least one of said multiple planes;

determining if any entity in said entity list overlaps said selected area;

dynamically determining during assembly of said multiple planes whether to draw said overlapping entities in a front-to-back or back-to-front fashion based upon the traits of each entity;

initializing the renderable area of all entities to be the same area as its bounding rectangle;

initially searching said list in a front-to-back order during a first pass;

checking each individual entity's rendering area for overlap with said selected area;

repeating said search step if said entity does not overlap said selected area;

halting said process if said entity is the last entity on said list;

determining if said overlapping entity is wholly opaque;

reducing the renderable area of the entity by intersecting it with said selected area;

determining if an overlapping, non-transparent entity intersects with an area covered by a transparent entity;

marking said overlapping entity as requiring back-to-front drawing if said overlapping entity is not wholly opaque and said overlapping entity does not have an empty rendering area;

searching said list in a back-to-front order during a second pass;

checking each individual entity to see if it has been marked for back-to-front drawing;

continuing said back-to-front search step if said entity is not marked as a back-to-front entity;

identifying if said entity is marked as a back-to-front entity;

drawing the renderable area of said entity in said selected area if said entity overlaps said selected area and said entity is marked as a back-to-front entity;

determining if the last entity in said list has been reached;

continuing said search step until said last entity is reached; and terminating said process when said last entity is reached.

2. An apparatus for displaying multiple planes of information on a selected area of a display or computer monitor, comprising:

a sprite engine, said sprite engine containing a list of entities wherein each entity corresponds to at least one of said multiple planes;

said sprite engine comprising a module for determining if an overlapping entity exists between said entities and said selected area; and said sprite engine comprising a module for determining during assembly of said multiple planes whether to draw said overlapping entities in a front-to-back or back-to-front fashion based upon the traits of each entity.

3. The apparatus of claim 2, wherein said list further comprises:

a field that indicates the parameters of a bounding rectanglebounding box of said entity.

4. The apparatus of claim 2, wherein said list further comprises:

a field that indicates whether said entity is whollytransparent or opaque or not.

5. The apparatus of claim 2, wherein said list further comprises:

a field that indicates a drawing function for said entity.

6. The apparatus of claim 2, said sprite engine further comprising:

a module for placing said entity in said list in said entity's Z order.

7. The apparatus of claim 2, said sprite engine further comprising:

a module for initializing the renderable area of all entities to be the same area as its bounding rectangle;

a module for searching said list in a front-to-back order during a first pass; and a module for checking each individual entity for overlap with said selected area.

8. The apparatus of claim 7, said sprite engine further comprising:

means for continuing said search if said entity does not overlap said selected area; and means for halting said search if said entity is the last entity on said list.

9. The apparatus of claim 8, said sprite engine further comprising:

a module for determining if said overlapping entity is wholly opaque.

10. The apparatus of claim 9, said sprite engine further comprising:

a module for reducing the renderable area of the entity by intersecting it with said selected area; and means for determining if an overlapping, opaque entity intersects with an area covered by a transparent entity.

11. The apparatus of claim 9, said sprite engine further comprising:

means for allowing said overlapping entity to draw its renderable area in said selected area if said overlapping entity is wholly opaque and does not intersect with an area covered by a transparent entity; and means for reducing the total size of said selected area by subtracting said overlapping entity's area from said selected area.

12. The apparatus of claim 11, said sprite engine further comprising:

means for terminating said search if said overlapping entity is the last entity in said list and continuing said search if said last entity has not been reached or if the selected area becomes empty.

13. The apparatus of claim 10, said sprite engine further comprising:

a module for marking said overlapping entity as requiring back-to-front drawing if said overlapping entity is not wholly opaque and said overlapping entity does not have an empty rendering area.

14. The apparatus of claim 13, said sprite engine further comprising:

a module for searching said list in a back-to-front order during a second pass; and a module for checking each individual entity for overlap with said selected area.

15. The apparatus of claim 14, said sprite engine further comprising:

a module for checking each individual entity to identify if said entity is marked for back-to-front drawing.

16. The apparatus of claim 15, said sprite engine further comprising:

means for continuing said back-to-front search if said entity either does not overlap said selected area or is not marked for back-to-front drawing; and a module for drawing the renderable area of said entity in said selected area if said entity is an overlapping entity and is marked for back-to-front drawing.

17. A computer system including a frame buffer, display controller, monitor, and graphic subsystem, said graphic subsystem displaying multiple planes of information on a selected area of said monitor, wherein said graphic subsystem comprises:

a sprite engine, said sprite engine containing a list of entities wherein each entity corresponds to at least one of said multiple planes;

said sprite engine comprising a module for determining if an overlapping area exists between said entities and said selected area;

said sprite engine comprising a module for determining during assembly of said multiple planes whether to draw said overlapping entities in a front-to-back or back-to-front fashion based upon the traits of each entity;

a module for initializing the renderable area of all entities to be the same area as its bounding rectangle;

a module for searching said list in a front-to-back order;

a module for checking each individual entity's rendering area for overlap with said selected area;

means for continuing said search if said entity does not overlap said selected area;

means for halting said search if said entity is the last entity on said list;

a module for determining if said overlapping entity is wholly opaque;

means for reducing the renderable area of the entity by intersecting it with said selected area;

means for allowing the renderable area of said overlapping entity to draw in said selected area if said overlapping entity is wholly opaque;

means for reducing the total size of said selected area by subtracting said overlapping entity's area from said selected area;

means for terminating said search if said overlapping entity is the last entity in said list and continuing said search if said last entity has not been reached or if said selected area becomes empty;

a module for marking said overlapping entity as requiring back-to-front drawing if said overlapping entity is not wholly opaque and said overlapping entity does not have an empty rendering area;

a module for searching said list in a back-to-front order;

a module for checking each individual entity for overlap with said selected area;

means for continuing said back-to-front search if said entity is not marked for back-to-front drawing;

a module for drawing the renderable area of said entity in said selected area if said entity is marked for back-to-front drawing; and means for halting said back-to-front search if said entity is last entity on said list.

* * * * *